United States Patent Office 3,527,783
Patented Sept. 8, 1970

3,527,783
META-BORATES AND BOROXINES
Henryk A. Cyba, Evanston, Ill., assignor to Universal Oil Products Company, Des Plaines, Ill., a corporation of Delaware
No Drawing. Continuation-in-part of application Ser. No. 367,854, May 15, 1964. This application Feb. 5, 1968, Ser. No. 702,836
Int. Cl. C07f 5/04
U.S. Cl. 260—462       6 Claims

ABSTRACT OF THE DISCLOSURE

Meta-borates and boroxines of N,N-di-sec-alkyl-alkanolamine or of N,N-di-cycloalkyl-alkanolamine. The metaborates and boroxines are useful as weathering stabilizers in plastics, as additives in petroleum products and as bactericides.

CROSS REFERENCE TO RELATED APPLICATIONS

This is a continuation in part of application Ser. No. 367,854, filed May 15, 1964, now U.S. Pat. No. 3,382,208.

BACKGROUND OF THE INVENTION

In parent application Ser. No. 367,854, filed May 15, 1964, now U.S. Pat. No. 3,382,208, various boron derivatives of N,N-di-sec-alkyl-alkanolamine or of N,N-di-cycloalkyl-alkanolamine have been shown to be especially effective weathering agents for solid polymers and to possess other desirable additive properties.

DESCRIPTION OF THE INVENTION

Among the boron derivatives included in application Ser. No. 367,854, now U.S. Pat. No. 3,382,208 are the meta-borate and boroxine of N,N-di-sec-alkyl-alkanolamine and the meta-borate and boroxine of N,N-di-cycloalkyl-alkanolamine. These meta-borates and boroxines are believed to be new compositions of matter and the present application is being filed to so claim them.

In one embodiment the present invention relates to a meta-borate of N,N-di-sec-alkyl-alkanolamine or a meta-borate of N,N-di-cycloalkyl-alkanolamine.

In another embodiment the present invention relates to a boroxine of N,N-di-sec-alkyl-alkanolamine or a boroxine of N,N-di-cycloalkyl-alkanolamine.

The meta-borates generally are known to have a transitory existence and are present as stable compounds in the form of the trimer as the boroxine ring. However, because the tertiary nitrogen of the N,N-di-sec-alkyl-alkanolamine or N,N-di-cycloalkyl-alkanolamine meta-borate can coordinate to the boron atom, a relatively stable innercomplex may form. This will be discussed more fully hereinafter.

The meta-borates and boroxines of the present invention may be illustrated by the following formula:

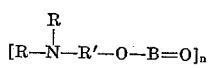

where R is selected from sec-alkyl or cycloalkyl, R' is alkylene and n is 1 or 3. In a preferred embodiment when R is sec-alkyl, it contains from 3 to about 20 carbon atoms and when R is cycloalkyl, the cyclic structure contains from 4 to about 12 carbon atoms. Also, in a preferred embodiment R' is an alkylene group of from 2 to about 8 carbon atoms.

The boroxine, which is a cyclic trimer of the meta-borate, may be illustrated by the following formula:

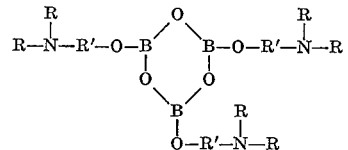

where R and R' have the same designation as hereinbefore set forth.

As hereinbefore set forth, the meta-borate of the present invention may coordinate to form a relatively stable complex of the following formula:

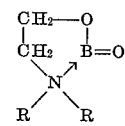

where R has the same designation as hereinbefore set forth.

Similarly because the tertiary nitrogen of the N,N-di-sec-alkyl-alkanolamine or of the N,N-di-cycloalkyl-alkanolamine meta-borate can coordinate to the boron, another form of the boroxine may be illustrated by the following formula:

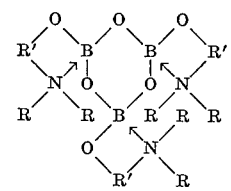

where R and R' have the same designation as hereinbefore set forth.

It is understood that the product of the present invention may comprise a mixture of the meta-borate, boroxine, coordinated meta-borate and/or coordinated boroxine, in which one of these compounds will predominate depending upon the specific conditions used in the preparation.

As hereinbefore set forth, the meta-borate or boroxine is a derivative of a particularly substituted alkanolamine. In one embodiment the particularly substituted alkanolamine is an N,N-di-sec-alkyl-alkanolamine. In a particularly preferred embodiment, each sec-alkyl group contains from 3 to about 20 carbon atoms although, when desired, each alkyl group may contain up to about 40 carbon atoms. Illustrative preferred alkanolamines in this embodiment include N,N-di-isopropyl-ethanolamine, N,N-di-sec-butyl-ethanolamine, N,N-di-sec-pentyl-ethanolamine, N,N-di-sec-hexyl-ethanolamine, N,N-di-sec-heptyl-ethanolamine, N,N-di-sec-octyl-ethanolamine, N,N-di-sec-nonyl-ethanolamine, N,N-di-sec-decyl-ethanolamine, N,N-di-sec-undecyl-ethanolamine, N,N-di-sec-dodecyl-ethanolamine, N,N-di-sec-tridecyl-ethanolamine, N,N-di-sec-tetradecyl-ethanolamine, N,N-di-sec-pentadecyl-ethanolamine, N,N-di-sec-hexadecyl-ethanolamine, N,N-di-sec-heptadecyl-ethanolamine, N,N-di-sec-octadecyl-ethanolamine, N,N-di-sec-nonadecyl-ethanolamine, N,N-di-sec-eicosyl-ethanolamine, etc., and corresponding compounds in which the ethanolamine moiety is replaced by propanol-amine or butanolamine and, when desired, by pentanolamine, hexanolamine, heptanolamine, octanolamine, etc.

In general, it is preferred that the alkyl groups are the same. However, when desired, the alkyl groups may be different but both of them should be of secondary configuration. Illustrative compounds in this modification includeN-isopropyl - N - sec - butyl-ethanolamine, N-isopropyl - N - sec-pentyl-ethanolamine, N-isopropyl-N-sec-hexyl - ethanolamine, N-isopropyl-N-sec-heptyl-ethanolamine, N - isopropyl - N-sec-octyl-ethanolamine, N-sec-butyl-N-sec-pentyl-ethanolamine, N-sec-butyl-N-sec-hexyl-ethanolamine, N-sec-butyl-N-sec-heptyl-ethanolamine, N-sec-pentyl-N-sec-hexyl-ethanolamine, N-sec-pentyl-N-sec-heptyl-ethanolamine, N - sec-hexyl-N-sec-heptyl-ethanolamine, N-sec-hexyl-N-sec-octyl-ethanolamine, etc. Here again, it is understood that the ethanolamine moiety may be replaced by an alkanolamine group containing up to 8 carbon atoms and preferably up to 4 carbon atoms. Although it is preferred that the substituents are alkyl groups, it is understood that the substituents may be alkenyl groups, but not necessarily with equivalent results.

In another embodiment the particularly substituted alkanolamine is N,N-di-cycloalkyl-alkanolamine. A preferred alkanolamine in this embodiment is N,N-di-cyclohexyl-ethanolamine. Other compounds include N,N-di-cyclobutyl-ethanolamine, N,N - di - cyclopentyl-ethanolamine, N,N-di-cycloheptyl-ethanolamine, N,N-di-cyclooctyl-ethanolamine, N,N - di - cyclononyl-ethanolamine, N,N-di-cyclodecyl-ethanolamine, N,N - di-cycloundecyl-ethanolamine, N,N - di - cyclododecyl-ethanolamine, etc., and similarly substituted compounds in which the ethanolamine moiety is replaced by an alkanolamine group containing from 3 to about 8 carbon atoms.

The N,N-di-sec-alkyl-alkanolamine and N,N-di-cycloalkyl-alkanolamine for use in the present invention may be obtained from any suitable source. Some of these particularly substituted alkanolamines are available in the open market or they may be prepared in any suitable manner. In one method, the alkanolamine is subjected to reductive alkylation with an alkyl ketone or a cycloalkyl ketone. For example, N,N-di-sec-octyl-ethanolamine is prepared by the reductive alkylation of ethanolamine with methyl heptyl ketone, ethyl pentyl ketone or propyl butyl ketone. Similarly, N,N-di-cyclohexyl-ethanolamine is prepared by the reductive alkylation of ethanolamine with cyclohexanone. It is understood that the ketone will be selected with regard to the particular N,N-di-substituted-ethanolamine desired. The reductive alkylation is effected in the presence of hydrogen and a suitable reductive alkylation catalyst. Any suitable reductive alkylation catalyst is employed including those containing nickel, platinum, palladium, etc., preferably composited with a suitable support. A particularly preferred catalyst comprises a composite of from about 0.1 to about 2% by weight of platinum with alumina, which may or may not contain from about 0.01% to about 1% by weight of fluorine and/or chlorine. Another suitable catalyst comprises an intimate mixture of copper oxide, chromium oxide and barium oxide. When using the platinum catalyst, the temperature generally will be within the range of from about 100° to about 260° C. and a hydrogen pressure of from about 100 to about 3,000 p.s.i. or more.

While the N,N-di-sec-alkyl-alkanolamine and N,N-di-cycloalkyl-alkanolamine may be prepared by the reductive alkylation of the corresponding alkanolamine as hereinbefore set forth, in another and preferred method, the corresponding N,N-di-sec-alkylamine or N,N-di-cycloalkylamine is subjected to oxyalkylenation by reaction with one mole of ethylene oxide, propylene oxide, butylene oxide styrene oxide or other desired alkylene oxide. This reaction is readily effected by charging the N,N-di-substituted-amine into a reaction zone and passing the alkylene oxide into contact with the amine. Preferably at least equal mole proportions of alkylene oxide and amine are employed, although an excess of one may be used to insure complete reaction. The reaction readily occurs at a low temperature which may range from room temperature to 150° C. in the presence of a catalyst as required.

It is an essential requirement of the present application that the alkanolamine is an N,N-di-substituted-alkanolamine and that these substituents are secondary alkyl or equivalent. It will be noted that the cyclohexyl substituent corresponds to a sec-alkyl substituent in that the carbon atom attached to the nitrogen is itself attached to two other carbon atoms. In another embodiment the particularly substituted alkanolamine may contain one sec-alkyl group and one cycloalkyl group as, for example, in compounds as N-isopropyl-N-cyclohexyl-ethanolamine, N-sec-butyl-N-cyclohexyl-ethanolamine, N - sec - pentyl-N-cyclohexyl-ethanolamine, N - sec-heptyl-N-cyclohexyl-ethanolamine, N - sec-octyl-N-cyclohexyl-ethanolamine, etc., and corresponding compounds in which the ethanolamine moiety is replaced by an alkanolamine moiety of from 3 to about 8 carbon atoms.

The meta-borate or boroxine of the present invention is prepared in any suitable manner. Any suitable borylating agent may be used. A particularly preferred borylating agent is boric acid, meta-boric acid or boric oxide. Other borylating agents include alkyl meta-borates in which the alkyl group preferably contains from 1 to 4 carbon atoms. In the use of the latter type borylating agent, the reaction is effected by transesterification and, accordingly, there is no advantage to using alkyl meta-borates containing more than 4 carbon atoms in the alkyl group, although the higher boiling alkyl meta-borates may be used when satisfactory and advantages appear therefor.

The reaction of the borylating agent and alkanolamine is effected in any suitable manner. The meta-borates and boroxines are formed at temperatures above about 100° C. and thus may be within the range of from about 100 to about 200° C. or more. In one method the reactants are refluxed in the presence of a solvent. Any suitable solvent may be used and advantageously comprises an aromatic hydrocarbon solvent including benzene, toluene, xylene, ethylbenzene, cumene, etc., or mixtures thereof. Also, n-hexane, n-heptane, n-octane, n-decane, n-dodecane and chlorinated hydrocarbons may be used. In fact, any water azeotropic solvent which is non-reactive with boric acid or alkanolamine may be used. The use of a solvent is particularly preferred when boric acid is used as the borylating agent. When using an alkyl borate as the borylating agent, the solvent may be omitted. While no catalyst normally is required, a catalyst may be used when employing the alkyl borate. Any suitable catalyst may be employed including sodium hydrogen sulfate, potassium hydrogen sulfate, tin oxide, polyalkyl tin derivatives, alkoxy tin derivatives, polyalkyl titanium derivatives, alkoxy titanium derivatives, trialkyl or trialkoxy aluminum, alcohol when using boric oxide etc. When using boric acid, meta-boric acid and alkyl meta-borate as the borylating agent, the borylating agent and alkanolamine are used in equal mole proportions, although a slight excess of one of the reactants may be used when desired. When using boron oxide as the borylating agent, it is used in a proportion of 0.5 mole thereof per 1 mole of alkanolamine.

As hereinbefore set forth, the reaction is readily effected by heating and refluxing the borylating agent and alkanolamine, with or without solvent and/or catalyst as required. Refluxing is continued until the required amount of water when using boric acid or alcohol when using alkyl meta-borate is collected. Following completion of the reaction, the solvent and alcohol, if any, may be removed, if desired, by vacuum distillation. The alkanolamine meta-borate or boroxine may be used as such or, when desired, the product may be retained in the solvent and used as such or the product may be prepared as a solution in a different solvent and used in this manner.

In general, longer refluxing times are used to insure preparation of the boroxine and may range from 3 to 24 hours or more. The temperature and time will be correlated to obtain completion of the reaction, as measured by the evolution of water or the appearance of the infrared absorption in the region of 13.8 to 13.9μ, or the characteristic lines of the boroxine ring in the Raman Spectrum.

In another method, the boroxine may be prepared by refluxing corresponding tris-(N,N-di-sec-alkyl-aminoalkyloxy)-borane or the corresponding tris-(N,N-di-cycloalkyl-aminoalkyloxy)-borane with meta-boric acid or boric oxide. Pure boroxine or a mixture of the boroxine with unreacted tris-(N,N-di-sec-alkyl-aminoalkyloxy)-borane or tris - (N,N - di-cycloalkyl-aminoalkyloxy)-borane may be obtained, depending upon the stoichiometry of the reactants. This mixture may offer advantages for certain uses and is included in the present invention.

The meta-borates or boroxines of the present invention will have varied utilities. In one embodiment these are used as additives for improving the weathering properties of solid organic substrates. Although the mechanism in which these compounds function is not completely understood, these compounds serve to protect substrates which undergo ultraviolet light induced oxidation. In addition, these compounds possess anti-static properties and adhesion improving properties. In addition, the compounds are effective as antioxidants and peroxide decomposers, combustion improvers, and bactericides, especially for petroleum products. Also, they may serve as dye sites in plastics. Furthermore, they are of ready solubility in most substrates. The substrates normally subject to exposure to weather include plastics. In addition, the additives of the present invention may be used in paints, varnishes and other coatings.

Illustrative plastics which are stabilized by the novel compounds of the present invention include polymers of monoolefins such as polyethylene, polypropylene, polybutylene, mixed ethylene propylene polymers, mixed ethylene butylene polymers, mixed propylene butylene polymers, mixed styrene ethylene polymers, mixed styrene propylene polymers, etc. The solid olefin polymers are used in many applications including electrical insulation, light weight outdoor furniture, awnings, cover for greenhouses, etc. In many of these applications the solid olefin polymer is exposed to sunlight and air.

In another embodiment the polymers include those prepared from diolefinic monomers as, for example, polybutadiene, or those in which the diolefin or diolefins are reacted with monoolefin or monoolefins, including ABS (acrylonitrile-butadiene-styrene polymers).

Another plastic being used commercially on a large scale is polystyrene. The polystyrenes are particularly useful in the manufacture of molded or machined articles which find application in such goods as windows, optical goods, automobile panels, molded household articles, etc. One disadvantage of polystyrene is its tendency to deteriorate when exposed to direct sunlight and air for extended periods of time.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, polyvinyl butyral, etc., or mixtures thereof.

Other plastics being used commercially on a large scale are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyyl chloride), rayon, etc. Here again, deterioration occurs due to ultraviolet light and oxidation.

Still other plastics are prepared from other monomers and are available commercially. Illustrative examples of such other solid polymers include polycarbonates, phenol-formaldehyde resins, urea - formaldehyde resins, melamine-formaldehyde resins, acryloid plastics which are derived from methyl, ethyl and higher alkyl acrylates and methacrylates as monomers used in the polymerization. Other polymers include polyacetals, especially polyformaldehydes such as "Delrin" and "Celcon." Still other substrates include vinyl, acrylic, nitrocellulose based coatings; especially cellulose acetate, cellulose acetate butyrate, ethyl cellulose, etc. Still other substrates are polyesters, including linear or crosslinked, reinforced polyesters, laminate polyesters, etc., polyurethanes, epoxy resins, various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Snythetic rubbers include SBR rubber (copolymer of butadiene and styrene), EPR rubber, terpolymer of ethylene, propylene and a diene, Buna A (copolymer of butadiene and acrylonitrile), butyl rubber (copolymer of butadiene and isobutylene), Neoprene rubber (chloroprene polymer), Thiokol rubber (polysulfide), silicone rubber, etc. The natural rubbers include hevea rubber, cautchouc, balata, gutta percha, etc. It is well known that rubber undergoes deterioration due to oxygen and, when exposed to direct sunlight for extended periods of time, also undergoes deterioration from this source.

The above are illustrative examples of various solid polymers, plastics and resins which are improved by the additives of the present invention. As hereinbefore set forth, still other substrates include paints, varnishes, drying oils, pigments, rust preventive coatings, wax coatings, protective coatings, etc. It is understood that the compounds of the present invention may be used in any coating which is subject to exposure to ultraviolet light, oxidation, heat, etc. While the compounds are especially useful in materials subject to such exposure, it is understood that the compounds of the present invention also may be used advantageously in other coatings, plastics, paints, etc., which normally are not exposed outdoors.

In many applications it is advantageous to utilize the compounds of the present invention in conjunction with other additives. For example, particularly improved results are obtained in the stabilization of plastics or resins, apparently due to a synergistic effect, when the compound of the present invention is used in admixture with a phenolic antioxidant including particularly 2,6 - ditertiary-butyl-4-methylphenol, or higher molecular weight derivatives such as 2,6-dilauryl-4-alkylphenyl, etc. Other inhibitors which may be used generally will be of the phenolic or amine type and include phenyl-alpha-naphthylamine, phenyl - beta - naphthylamine, phenothiazine, Nonox WSP, Nonox C1, dialkylated phenols, trialkylated phenols including 2,4 - dimethyl-6-tertiarybutylphenol, etc., Santonox R, Santowhite, alkyl-alkoxyphenols, 2246 (2,2 - methylene-bis-(4-methyl-6-tert - butylphenol) and 425 ( 2,2′ - methylene-bis - (4-ethyl-6-tert-butylphenol), diphenyl-p-phenylenediamine, 1,1,3 - tris - (2-methyl-4-hydroxy - 5 - t-butylphenyl) - butane, 703 (2,6-di-tert-butyl-alpha-dimethylamino - p - cresol), 4,4′-bis-(2-methyl-6 - tert - butylphenol), 4,4′ - thiobis-(6-tert-butyl-o-cresol), 4,4′ - bis - (2,6-di-tert-butylphenol), 4,4′-methylene-bis-(2,6 - di-tert-butylphenol), various iranoxes, various ionoxes such as 1,3,5 - trimethyl-2,4,6-tris-(3,5-di-tert-butyl - 4 - hydroxybenzyl) - benzene, etc., various plastanoxes such as 2,6-bis-(2′-hydroxy - 3′ - tert-butyl- 5'-methylbenzyl) - 4 - methylphenol, etc., Salol (salicylic acid esters), p - octylphenylsalicylate, various phosgene alkylated phenol reaction products, various alkoxyalkyldihydroxybenzophenones, polyalkyldihydroxybenzophenones, tetrahydroxybenzophenones, 2,4,5 - trihydroxybutyrophenone and especially such hydroxybenzophenones as 2,2' - dihydroxy - 4 - octoxybenzophenone, 2,2'-dihydroxy - 4 - decoxybenzophenone, 2,2' - dihydroxy-4-dodecoxybenzophenone, 2,2' - dihydroxy-4-octadecoxybenzophenone, etc., in general any alkoxy or cycloalkoxy substituted 2,2'-dihydroxybenzophenone, 2 - hydroxy-4'-octoxybenzophenone, 2 - hydroxy - 4' - decoxybenzophenone, 2 - hydroxy - 4' - dodecoxybenzophenone, etc. in general any alkoxy or cycloalkoxy substituted 2-hydroxybenzophenone. Other ultraviolet light stabilizers include nickel-bis - dithiocarbamates, nickel - bis-dihydroxypolyalkylphenol sulfides, especially (2,2'-thiobis - (4-t-octylphenolato)-n-butylamine nickel (II), dilauryl beta-mercaptodipropionate, dihydroxytetralkyl sulfides, dihydroxytetralkyl methanes, various trithiophosphites as trilaurylthiophosphite, dialkylphosphites, trialkylphosphites, high molecular weight nitriles, various Mannich bases, various N - hydroxyphenylbenzotriazoles such as 2 - (2'-hydroxy-5' - ocetylphenyl)-benzotriazole, 2 - (2'-hydroxy-5'-dodecylphenyl) - benzotriazole, 2 - (2'-hydroxy-5'-octoxyphenyl) - benzotriazole, 2 - (2'-hydroxy-3'-tert-butyl-5'-methyl)-benzothiazole, 2 - (2' - hydroxy-5'-dodecoxyphenyl) - benzotriazole, Tinuvin 326, Tinuvin 327, Tinuvin P, etc., in general, any alkyl or alkoxyphenyl substituted benzotriazole, etc. The additional inhibitor may be used in a concentration of from about 1% to about 75% by weight of the compound of the present invention. Generally, the additional inhibitor will be used in a concentration within the range of from about 0.001% to about 3% and more particularly from about 0.01% to about 2% by weight of the substrate.

The additive of the present invention will be used in a stabilizing concentration which will depend upon the particular substrate. The additive may be used in a concentration as low as 0.0001% to as high as 25% but generally will be used in a concentration of from about 0.01% to about 5% by weight of the substrate. The additive is incorporated in the substrate in any suitable manner. Incorporation into a solid plastic is readily obtained by adding the additive to the hot melt with stirring, generally in a Banbury mixer, extruder or other device. When added to paint, the additive is incorporated into the paint with intimate stirring.

The additive of the present invention may be utilized as such or prepared as a solution in a suitable solvent including alcohols and particularly methanol, ethanol, propanol, butanol, etc., hydrocarbons and particularly benzene, toluene, xylene, cumene, Decalin, etc.

The following examples are introduced to illustrate further the novelty and utility of the present invention but not with the intention of unduly limiting the same.

EXAMPLE I

The compound of this example is the meta-borate (boroxine) formed by the reaction of N,N-di-cyclohexyl-ethanolamine and boric acid. This reaction was effected by heating and refluxing 33.75 g. (0.15 mole) of N,N-di-cyclohexyl-ethanolamine and 9.28 g. (0.15 mole) of boric acid in the presence of 100 g. of benzene. The temperature of reaction was above 90° C. and a total of 4.9 cc. of water was collected. The product was a solid having a boron content of 4.05% by weight which corresponds to the theoretical boron content of 4.15% by weight for the meta-borate or boroxine formed by the reaction of equal mole proportions of N,N-di-cyclohexyl-ethanolamine and boric acid.

EXAMPLE II

The compound of this example is the boroxine formed by the reaction of equal mole proportions of N,N-di-sec-octyl-ethanolamine and meta-boric acid. The reactants are heated and refluxed in toluene solvent at a temperature of about 110° C. The heating and refluxing are continued until the required amount of water is collected.

EXAMPLE III

The compound of this example is the boroxine of N,N-di-isopropyl-propanolamine. It is prepared by heating and refluxing six moles of N,N-di-isopropyl-propanolamine and three moles of boric oxide in the presence of toluene solvent. The heating and refluxing are continued until the desired amount of water is collected.

EXAMPLE IV

The meta-borate (boroxine) of this example is prepared by heating and refluxing 1 mole proportion of N,N-di-sec-hexyl-ethanolamine and 1 mole proportion of boric acid. The heating and refluxing are continued until the desired amount of water is recovered.

EXAMPLE V

The meta-borate (boroxine) of this example is prepared by heating and refluxing 1 mole proportion of N,N-di-cyclooctyl-ethanolamine and 1 mole proportion of n-butyl meta-borate at a temperature up to about 180° C. The heating and refluxing are continued until the desired amount of butanol is collected, the butanol being formed by the transesterification reaction.

EXAMPLE VI

The boroxine of this example is prepared by heating and refluxing equal mole proportions of tris-(N,N-di-cyclohexyl-aminoethyloxy)-borane and boric acid. The heating and refluxing is effected in the presence of xylene solvent at a temperature of about 160° C. for a period of about 14 hours.

EXAMPLE VII

The meta-borate (boroxine) of N,N-di-cyclohexyl-ethanolamine, prepared as described in Example I is used as a weathering agent in plastic. The plastic of this example is solid polypropylene. The solid polypropylene without inhibitor is stated to have properties substantially as follows:

Table I

Specific gravity—0.910–0.920.
Refractive index, $n_D^{25}$—1.510.
Heat distortion temperature
    at 66 p.s.i. load—116° C.
    at 264 p.s.i. load—66° C.
Tensile yield strength, p.s.i. (ASTM D–638–58T) (0.2" per min.)—4700.
Total elongation, percent—300–400.
Stiffness flexural (ASTM D747–50) $10^5$ p.s.i.—1.8.
Shore hardness (ASTM D676–55T)—74D.

The polypropylene is milled in a two-roll heated mill of conventional commercial design and the additive, when employed, is incorporated in the sample during the milling. The samples are pressed into sheets of about 17 mil thickness and cut into plaques of about 1⅜" x 1½". The plaques are inserted into plastic holders, affixed onto a rotating drum and exposed to carbon arc rays at about 52° C. in a Weather-Ometer. The samples are examined periodically by infrared analysis to determine the carbonyl band at 1715 cm.$^{-1}$ which is reported as the "carbonyl number." The higher intensity of the carbonyl band indicates a higher carbonyl concentration (expressed as carbonyl number) and accordingly increased deterioration.

A sample of the polypropylene without inhibitor develops a carbonyl number of greater than 1,000 within 120 hours of exposure in the Weather-Ometer. In contrast, another sample of the polypropylene containing 1% by weight of the meta-borate (boroxine) of N,N-di-cyclohexyl-ethanolamine, prepared as described in Example I, will not develop a carbonyl number of greater than 1,000

EXAMPLE VIII

As hereinbefore set forth, advantages appear in the use of the boroxine of the present invention in conjunction with a phenolic antioxidant. In this example, 1% by weight of the boroxine of N,N-di-cyclohexyl-ethanolamine, prepared as described in Example I, and 0.15% by weight of 2,6-di-tertiary-butyl-4-methylphenol are incorporated in another sample of the polypropylene described in Example VII and the samples were evaluated outdoors at Des Plaines, Ill., location at an angle of 45°. The sample of polypropylene had a yield value of 4820 p.s.i. after 437 days of exposure or a yield value of 3340 p.s.i. after 467 days of exposure. No brittleness was evident after two summers of exposure outdoors. By contrast the control samples, uninhibited polypropylene, exposed outdoors at the same time, failed on April 20 after only 29 days, the yield value being 2604 p.s.i. The control sample, not containing the boroxine of the present invention, was brittle at that time.

EXAMPLE IX

The meta-borate of N,N-di-sec-octyl-ethanolamine, prepared as described in Example II, is used as a weathering agent in solid polyethylene of the high density type. An inhibited product of this polyethylene is marketed commercially under the tradename of "Fortiflex." A special batch of this polyethylene free of inhibitor is obtained and is cut into plaques in the same manner described in Example VII and evaluated in the Weather-Ometer. A sample of this polyethylene without inhibitor, when evaluated in the Weather-Ometer, increases from a carbonyl number of 28 to a carbonyl number of 855 within 624 hours. In contrast, another sample of the polyethylene containing 1% by weight of the additive prepared as described in Example III does not develop a carbonyl number above 800 for a considerably longer period of time.

EXAMPLE X

The meta-borate of N,N-di-isopropyl-propanolamine prepared as described in Example III is incorporated in a concentration of 1% by weight in polystyrene and serves to inhibit deterioration of the polystyrene upon exposure to weathering.

I claim as my invention:

1. A meta-borate of the following formula

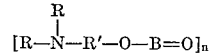

where R is selected from sec-alkyl containing from 3 to about 20 carbon atoms, and cycloalkyl containing from 4 to about 12 carbon atoms in the cyclic structure; R' is alkylene containing from 2 to about 8 carbon atoms; and $n$ is 1 or 3.

2. The compound of claim 1 in which R is sec-alkyl of from 3 to about 20 carbon atoms.
3. The compound of claim 2 where R is sec-octyl.
4. The compound of claim 1 where R is cycloalkyl having from 4 to 12 carbon atoms in the cyclic structure.
5. The compound of claim 4 where R is cyclohexyl.
6. The compound of claim 1 where R' is ethylene.

References Cited

UNITED STATES PATENTS

| | | | |
|---|---|---|---|
| 3,072,737 | 1/1963 | Chen | 260—462 X |
| 2,259,175 | 10/1941 | Paul | 260—462 X |
| 3,410,913 | 11/1968 | McMahon et al. | 260—462 X |

LEON ZITVER, Primary Examiner

LEO DECRESCENTE, Assistant Examiner